(12) United States Patent
Chandra et al.

(10) Patent No.: US 10,922,185 B2
(45) Date of Patent: Feb. 16, 2021

(54) I/O TO UNPINNED MEMORY SUPPORTING MEMORY OVERCOMMIT AND LIVE MIGRATION OF VIRTUAL MACHINES

(71) Applicant: Google LLC, Mountain View, CA (US)

(72) Inventors: Prashant Chandra, San Jose, CA (US); Ian Mclaren, Mountain View, CA (US); Jon Olson, Seattle, WA (US); Jacob Adriaens, Madison, WI (US)

(73) Assignee: Google LLC, Mountain View, CA (US)

( * ) Notice: Subject to any disclaimer, the term of this patent is extended or adjusted under 35 U.S.C. 154(b) by 185 days.

(21) Appl. No.: 16/279,462

(22) Filed: Feb. 19, 2019

(65) Prior Publication Data

US 2021/0019230 A1    Jan. 21, 2021

(51) Int. Cl.
| | | |
|---|---|---|
| *G06F 11/00* | (2006.01) |
| *G06F 11/14* | (2006.01) |
| *G06F 12/10* | (2016.01) |
| *G06F 9/455* | (2018.01) |

(52) U.S. Cl.
CPC ...... *G06F 11/1451* (2013.01); *G06F 9/45558* (2013.01); *G06F 12/10* (2013.01); *G06F 2009/4557* (2013.01); *G06F 2009/45583* (2013.01); *G06F 2009/45595* (2013.01); *G06F 2201/84* (2013.01); *G06F 2212/657* (2013.01)

(58) Field of Classification Search
CPC ............. G06F 11/1451; G06F 9/45558; G06F 2009/45579; G06F 2009/45583; G06F 12/10
See application file for complete search history.

(56) References Cited

U.S. PATENT DOCUMENTS

| 8,521,912 | B2 | 8/2013 | Aloni et al. |
| 2002/0007427 | A1 | 1/2002 | Forin |
| 2011/0019531 | A1* | 1/2011 | Kim .................... G06F 11/2097 370/216 |

(Continued)

OTHER PUBLICATIONS

International Search Report and Written Opinion for International Application No. PCT/US2019/065397 dated Mar. 4, 2020. 15 pages.

(Continued)

*Primary Examiner* — Michael Maskulinski
(74) *Attorney, Agent, or Firm* — Lerner, David, Littenberg, Krumholz & Mentlik, LLP

(57) ABSTRACT

Systems and methods of error handling in a network interface card (NIC) are provided. For a data packet destined for a local virtual machine (VM), if the NIC cannot determine a valid translation memory address for a virtual memory address in a buffer descriptor from a receive queue of the VM, the NIC can retrieve a backup buffer descriptor from a hypervisor queue, and store the packet in a host memory location indicated by an address in the backup buffer descriptor. For a transmission request from a local VM, if the NIC cannot determine a valid translated address for a virtual memory address in the packet descriptor from a transmit queue of the VM, the NIC can send a message to a hypervisor backup queue, and generate and transmit a data packet based on data in a memory page reallocated by the hypervisor.

24 Claims, 6 Drawing Sheets

(56) References Cited

U.S. PATENT DOCUMENTS

| | | | |
|---|---|---|---|
| 2014/0089450 A1* | 3/2014 | Raindel | G06F 3/0656 709/213 |
| 2015/0212948 A1 | 7/2015 | Tsirkin | |
| 2015/0212956 A1 | 7/2015 | Tsirkin et al. | |
| 2015/0378930 A1* | 12/2015 | Sahita | G06F 9/45558 711/207 |
| 2016/0378530 A1* | 12/2016 | Ramasubramanian | G06F 9/45558 718/1 |
| 2018/0150327 A1 | 5/2018 | Tsirkin | |

OTHER PUBLICATIONS

Dalton, Michael, et al. "Andromeda: Performance, Isolation, and Velocity at Scale in Cloud Network Virtualization." In 15th {Usenix} Symposium on Networked Systems Design and Implementation, NSDI '18, USENIX Association, Apr. 9-11, 2018.

Liss, Liran. "On Demand Paging for User-level Networking." Open Fabrics Alliance. Mellanox Technologies. Sep. 30, 2013.

\* cited by examiner

I/O TO UNPINNED MEMORY SUPPORTING MEMORY OVERCOMMIT AND LIVE MIGRATION OF VIRTUAL MACHINES

BACKGROUND

In a cloud computing environment, a single host or server can host multiple virtual machines. Each virtual machine can be allocated a portion of the host's memory. The allocated memory may be "pinned," with specific memory addresses or regions assigned to a particular virtual machine such that the host operating system (OS) can no longer reallocate those memory addresses. Alternatively, the allocated memory may be "unpinned," where a particular amount of memory is assigned to a particular virtual machine, but exact memory regions are not, thus the memory regions may be allocated to other virtual machines or processes without terminating the virtual machine that previously used the memory region.

Assigning unpinned memory to the virtual machines allows the host to "overcommit" memory; that is, to allocate an amount of memory to each virtual machine that, in aggregate, exceeds the total available memory of the host. The host overcommits memory based on an assumption that a virtual machine generally will not use its entire allocation of memory all of the time. Thus, overcommitting memory allows for higher utilization and/or a need for less total memory in the host.

SUMMARY

At least one aspect is directed to a method of error handling in a network interface card of a host device. The method includes receiving, at a processor of the network interface card, a data packet addressed to a virtual machine executing on the host device. The method includes selecting, by the processor, a receive queue corresponding to the virtual machine and residing in a memory of the network interface card. The method includes retrieving, by the processor, a buffer descriptor from the receive queue. The buffer descriptor includes a virtual memory address. The method includes, in response to determining that the virtual memory address is not associated with a valid translated memory address associated with the virtual machine, retrieving, by the processor, a backup buffer descriptor from a hypervisor queue residing in the network interface card memory and corresponding to a hypervisor executing on the host device; and storing, by the processor, contents of the data packet in a host device memory location indicated by a backup memory address in the backup buffer descriptor.

At least one aspect is directed to a system comprising a host device executing one or more virtual machines and a hypervisor, a host device memory, and a network interface card. The network interface card is configured to receive a data packet addressed to a virtual machine executing on the host device. The network interface card is configured to select a receive queue corresponding to the virtual machine and residing in a memory of the network interface card. The network interface card is configured to retrieve a buffer descriptor from the receive queue. The buffer descriptor includes a virtual memory address. The network interface card is configured to, in response to determining that the virtual memory address is not associated with a valid translated memory address associated with the virtual machine retrieve a backup buffer descriptor from a hypervisor queue residing in the network interface card memory and corresponding to a hypervisor executing on the host device; and store contents of the data packet in a host device memory location indicated by a backup memory address in the backup buffer descriptor.

At least one aspect is directed to a method of error handling in a network interface card of a host device. The method includes receiving, at a processor of the network interface card, a transmission request from a virtual machine executing on the host device. The method includes retrieving, by the processor, a packet descriptor from a transmit queue corresponding to the virtual machine and residing in a memory of the network interface card. The packet descriptor includes a virtual memory address. The method includes, in response to determining that the virtual memory address is not associated with a valid translation memory address associated with the virtual machine, sending, by the processor, a message to a backup queue residing in the network interface card memory and corresponding to a hypervisor executing on the host device. The message includes an identifier of the transmit queue and the virtual memory address. The method includes receiving, by the processor, a notification from the hypervisor that a host device memory region has been reallocated to the virtual machine. The method includes retrieving, by the processor from the transmit queue, a second packet descriptor including a second virtual memory address. The method includes translating, by the processor, the second virtual memory address. The method includes generating, by the processor, a data packet using data from a host device memory location indicated by the translated second virtual memory address. The method includes transmitting, by the processor, the data packet.

At least one aspect is directed to a system comprising a host device executing one or more virtual machines and a hypervisor, a host device memory, and a network interface card. The network interface card is configured to receive a transmission request from a virtual machine executing on the host device. The network interface card is configured to retrieving, by the processor, a packet descriptor from a transmit queue corresponding to the virtual machine and residing in a memory of the network interface card. The packet descriptor includes a virtual memory address. The network interface card is configured to, in response to determining that the virtual memory address is not associated with a valid translation memory address associated with the virtual machine, send a message to a backup queue residing in the network interface card memory and corresponding to a hypervisor executing on the host device. The message includes an identifier of the transmit queue and the virtual memory address. The network interface card is configured to receive a notification from the hypervisor that a host device memory region has been reallocated to the virtual machine. The network interface card is configured to retrieve, from the transmit queue, a second packet descriptor including a second virtual memory address. The network interface card is configured to translate the second virtual memory address. The network interface card is configured to generate a data packet using data from a host device memory location indicated by the translated second virtual memory address. The network interface card is configured to transmit the data packet.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure relates generally to systems and methods for providing input/output to and from unpinned memory used by virtual machines. The techniques described herein allow a host or server executing virtual machines to over-commit memory to the virtual machines; that is, allowing the host to allocate an amount of memory to each virtual machine that, in aggregate, would exceed a total amount of host memory available to the virtual machines. The techniques also facilitate live migration of the virtual machines within the host and between the host and a second host.

For unpinned memory of a host—that is, not permanently assigned to a virtual machine—communication to and from the virtual machines may require the host to translate virtual machine memory addresses to physical memory addresses and vice versa. If the host attempts to translate a virtual machine address to a physical memory address that is no longer allocated to that virtual machine, the host may get a translation error. For example, the host device may experience errors when its network interface card tries to assemble and transmit packets from physical memory addresses no longer allocated to the virtual machine that requested transmission of that packet. This can be due to, for example, a period of time elapsing between when the requested transmission is scheduled to when the requested transmission is executed. During this period of time, physical memory addresses within the host memory may be reallocated among the virtual machines. In such a case, the network interface card will not be able to translate the descriptor from the virtual machine's transmit queue to a physical memory address. Similarly, the host device can experience errors when the network interface card receives a packet for a destination virtual machine, but cannot properly translate a virtual machine address to a host device memory location assigned to the destination virtual machine. This disclosure therefore presents systems and methods for graceful handling of translation errors caused by reallocation of unpinned physical memory among the virtual machines executing on the host.

Similar failures of address translation can occur during live migration of a virtual machine, as the virtual machine migrates to a different memory space or different host device altogether. In such cases, the same systems and methods can be used to provide for graceful handling of translation errors during virtual machine live migration. The systems and methods can include addition features that provide for dirty bit or dirty page tracking; that is, keeping track of additions to, or modifications of, memory allocated to the virtual machine at its original location as the memory contents are copied to the virtual machine's new location. Once the virtual machine is up and running in its new location or host, the dirty bits/pages can be copied to the virtual machine's new memory space.

Figure 1:
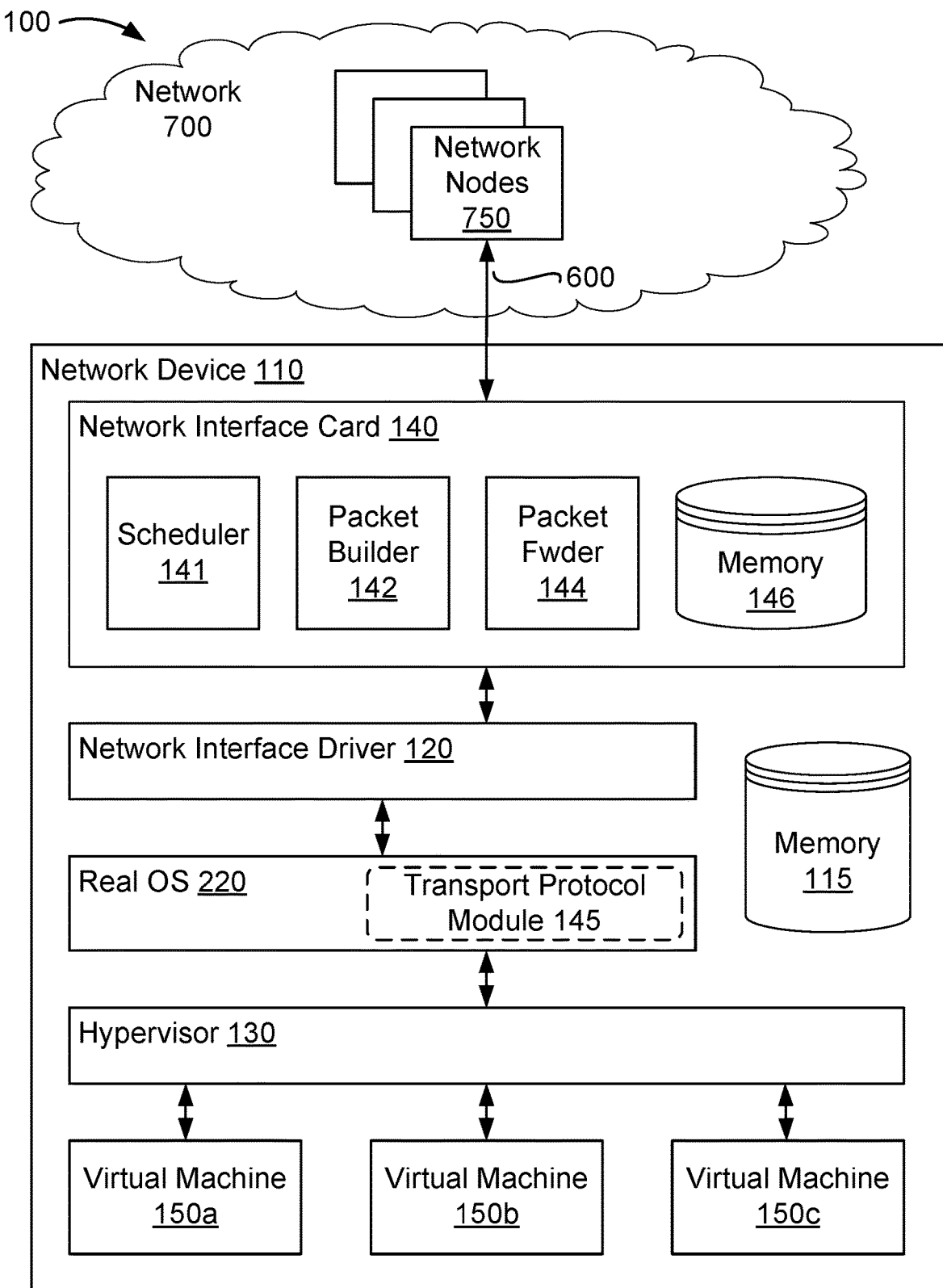
FIG. 1 is a block diagram of a network environment with a network device, according to some implementations.

FIG. 1 is a block diagram of a network environment 100 with a network device 110, according to some implementations. In broad overview, the illustrated network environment 100 includes a network 700 of interconnected network nodes 750. The network nodes 750 participate in the network 700 as data sources, data destinations (or data sinks), and/or intermediary nodes such as switches, routers, and/or gateways propagating data from sources towards destinations through the network 700. The network 700 includes the network device 110 with links 600 to various other participating network nodes 750.

Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network. The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network; for example, an ad hoc WiFi peer-to-peer network. Any type and/or form of data network and/or communication network can be used for the network 700. It can be public, private, or a combination of public and private networks. In general, the network 700 is used to convey information between computing devices; for example, network nodes 750, and the network device 110.

Figure 6:
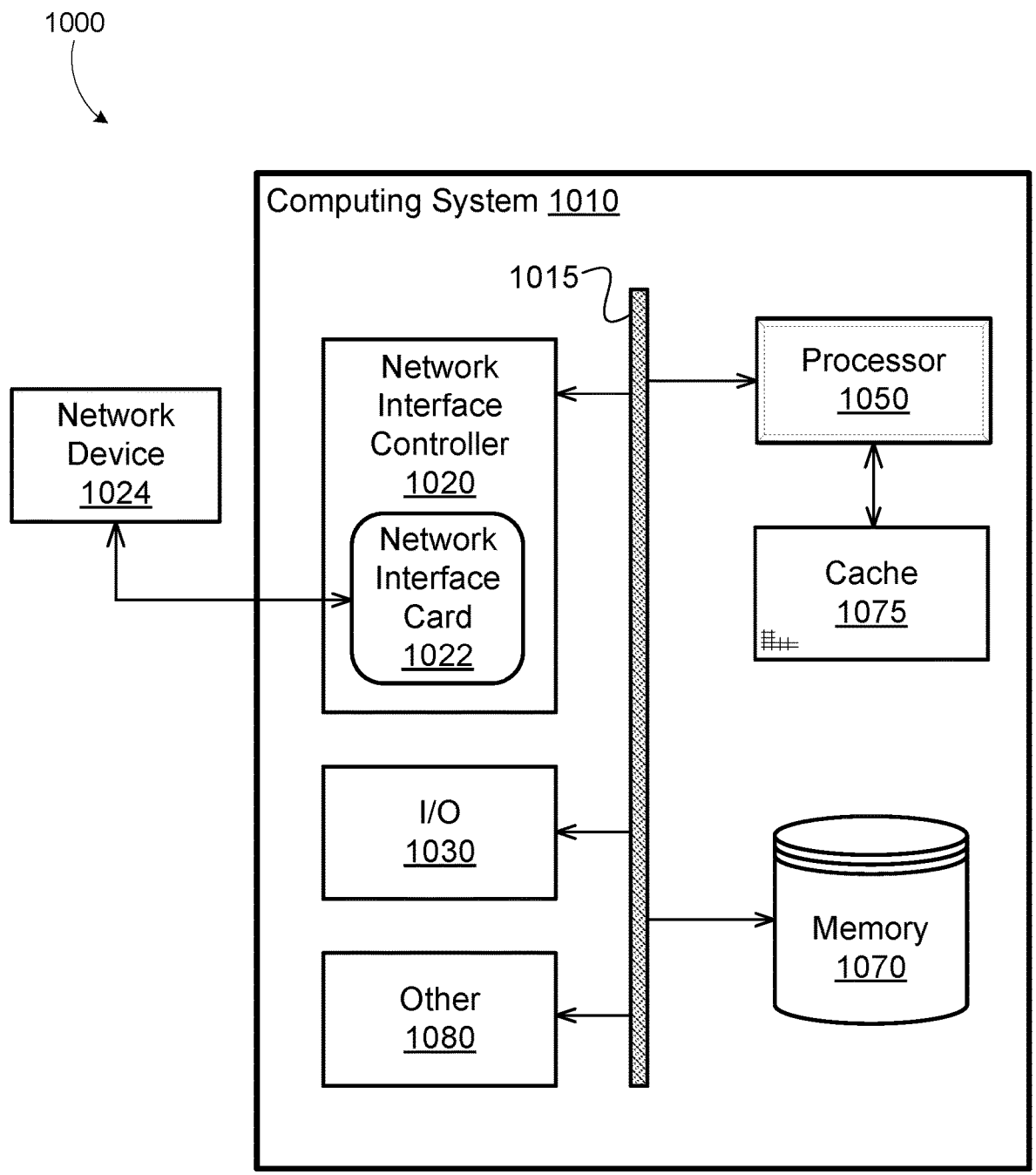
FIG. 6 is a block diagram of an example computing system that may be employed to implement elements of the systems and methods described and illustrated herein, according to an illustrative implementation.

As shown in FIG. 1, the network device 110 is a host device or server executing one or more virtual machines 150a-150c (generally virtual machines 150) on one or more CPUs of the network device 110. In some implementations, the network device 110 has configuration similar to that of a computing system 1010 as shown in FIG. 6. For example, the memory 115 can have a configuration similar to that of a memory 1070 as shown in FIG. 6, and the network interface card 140 can have configuration similar to that of a network interface card 1022 and/or a network interface controller 1020 as shown in FIG. 6. The computing system 1010 is described in more detail below, in reference to FIG. 6. The elements shown in the computing system 1010 illustrated in FIG. 6 do not all need to be present in some implementations of the network device 110 illustrated in FIG. 1.

The network device 110 includes a network interface driver 120, a memory 115, a network interface card 140, a real OS 220, a hypervisor 130, and the virtual machines 150. The hypervisor 130 manages operation of the virtual machines 150, including spinning up and terminating the virtual machines 150, managing allocation of memory 115 to the virtual machines 150, and migrating the virtual machines 150 to other network devices. For example, the hypervisor 130 can allocated pinned and unpinned memory to the virtual machines 150. In some implementations, the hypervisor 130 can allocate memory to the virtual machines that in aggregate exceeds a total host device memory available to the virtual machines.

The network device 110 includes the memory 115. In some implementations, the memory 115 may store computer executable instructions for a real operating system (OS) 220 and a transport protocol module 145 (such as a TCP protocol module or the TCP layer of the network stack) to be executed on a processor of the network device 110. In some implementations, the memory 115 may store computer executable instructions related to the operation and use of a network interface driver 120. In some other implementations, the memory 115 may store computer executable instructions for the hypervisor 130 to be executed on a processor of the network device 110. In some other implementations, the memory 115 may store computer executable instructions for the virtual machines 150 executing on the network device 110. In some other implementations, the memory 115 may store data for forwarding to the virtual machines 150, processing by the virtual machines 150, and/or transmission from the virtual machines 150. The memory 115 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Functionality implemented within the TCP layer of a network device can additionally or alternatively execute in another network protocol module within the transport layer, the network layer or a combined transport/network layer of a network protocol stack. For example, the functionality can be implemented in a user datagram protocol (UDP) module, reliable datagram protocol (RDP) module, reliable user datagram protocol (RUDP) module, or a datagram congestion control protocol (DCCP) module. As used herein, a network layer, a transport layer, or a combined transport/network layer will generally be referred to as a packet layer of the network protocol stack.

The network interface driver 120 can include a network interface driver software module running on a real OS. A network interface driver, such as the network interface driver 120, can be a collection of computer executable instructions stored in the memory 115 that when executed by a processor help facilitate network communications. In some other implementations, the network interface driver 120 may be implemented as logic implemented in a hardware processor or other integrated circuit, or as a combination of hardware and software logic. The network interface driver 120 can communicate with one of the software virtual machines 150 (or applications executing on the virtual machines 150), via a guest OS of a virtual machine (or in some implementations, through a hypervisor and the guest OS if operating in a virtual machine environment). In some implementations, the network interface driver 120 is included within a first layer of a transmission control protocol (TCP) stack of the real OS 220 of the network device 110 and communicates with a software module or application that is included in an upper layer of the TCP stack. In one example, the network interface driver 120 is included within a transport layer of a TCP stack and communicates with a software module or application that is included in an application layer of the TCP stack. In another example, the network interface driver 120 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 120 can be included as a portion of the network interface card 140.

The network interface card 140 includes a scheduler 141, a packet builder 142, a packet forwarder 144, and a memory 146. The scheduler 141, packet builder 142, and packet forwarder 144 can be functional blocks of one or more processors of the network interface card 140, such as an application-specific integrated circuit (ASIC) having discrete functional blocks. In some implementations, the scheduler 141, packet builder 142, and packet forwarder 144 can be functional blocks of software executing on one or more general-purpose processors of the network interface card. In some implementations, the functions of the scheduler 141, packet builder 142, and packet forwarder 144 can be combined of further subdivided into different functional blocks.

The memory 146 can store computer executable instructions for execution by network interface card 140, such as instructions relating to the operation of the scheduler 141, packet builder 142, and packet forwarder 144. The memory 146 can provide for caches, buffers, translation tables, and/or time-indexed data structures used by the network interface card 140, virtual machines 150, hypervisor 130 for the transmission and receipt of data packets over the network 700. For example, the memory 146 can store, for each virtual machine 150, one or more receive queues and transmit queues containing packet descriptors. Each packet descriptor can contain a virtual memory address corresponding to a virtual machine memory region. In another example, the memory 146 can store tables containing translations of virtual memory addresses associated with virtual machines to physical memory addresses of regions of the network device 110 memory 115 respectively allocated to the virtual machines. The memory 146 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The network interface card 140 includes a scheduler 141. The scheduler 141 can schedule transmission of a corresponding data packet based on a transmission request received from a virtual machine 150. In some implementations, the scheduler 141 is utilized to manage a sequence of packet identifiers inserted into and extracted from a time-indexed data structure. The time-indexed data structure can be a data structure in the network interface card 140 processor or memory 146 that facilitates the scheduling of data packet transmissions. In some implementations, before making a scheduling, or any other decision with respect to a data packet, the scheduler 141 can i) copy at least the header of the packet to the network interface card memory 146, ii) prepare descriptors that point to the packet header and packet payload (which may or may not be copied to the network interface card memory 146), and iii) execute scheduling decisions and queue an identifier of the descriptor in the time-indexed data structure. The scheduler 141 need not perform these operations in this exact order and may, in some implementations, perform two or more of these operations during overlapping time periods.

The network interface card 140 includes the packet builder 142. The packet builder 142 can receive a transmission request from a virtual machine 150 (or the scheduler 141), and execute packet generation and transmission. The packet builder 142 includes packet generation logic that can generate the data packet using a set of pointers stored in the memory 146 and associated with the communication. Each pointer can be a memory descriptor. The memory descriptor can describe a packet; for example, by specifying a memory location and length of packet data. In some implementations, the packet data can be in the host memory 115. In some implementations, the packet data can be in the network interface card memory 146. The packet builder 142 can build packets for transmission based on the identifiers in the time-indexed data structure in the memory 146.

An example operation of the packet builder 142 is as follows. In some implementations, a data packet transmission is scheduled by the scheduler 141. The scheduler 141 would have previously inserted a packet identifier corresponding to a transmission request received from a virtual machine 150 in the time-indexed data structure in the memory 146. When a scheduled time for transmission of the packet arrives, the packet builder 142 can receive or retrieve the packet identifier from the time-indexed data structure in the memory 146, and use the packet identifier to generate the packet for transmission. In some implementations, however, the packet builder 142 can receive the transmission request directly from the virtual machine 150, where the transmission request is or contains the packet identifier. Based on the transmission request or packet identifier, the packet builder 142 can retrieve a packet descriptor from a transmit queue corresponding to the virtual machine 150 identified in the transmission request. The transmit queue can reside in the memory 146. The packet descriptor can include a virtual memory address associated with the virtual machine. The virtual memory address can correspond to a region of the memory 115 that is supposed to contain data for the data packet. The packet descriptor may also include a length that can define how many contiguous data blocks the packet builder 142 to should retrieve from the memory 115. The packet builder 142 can attempt to translate the virtual memory address. If the packet builder 142 is able to determine a valid translated address for the virtual memory address, the packet builder 142 can retrieve the data from the specified region of the memory 115 to generate the data packet. The network interface card 140 can then transmit the generated data packet.

The packet builder 142 can translate virtual memory addresses to translated addresses (physical memory addresses or specific memory locations) using one or more tables stored in the network interface card memory 146. For example, the memory 146 may maintain a table including columns for virtual memory addresses and physical memory addresses, respectively. The table may also include a column for the virtual machine associated with the virtual memory address and/or the virtual machine to which the physical memory address is currently allocated. In some implementations, address correlations and virtual machine correlations may be stored in separate tables. A translation error can occur in several scenarios. For example, when the translation tables do not list the virtual memory address, or do not list a corresponding physical memory address for that virtual memory address. In another example, either the virtual memory address or corresponding physical address may not be associated with the virtual machine who sent the request (or, in the case of receiving a data packet, the physical memory address corresponding to the destination virtual memory address may not be associated with the destination virtual machine). These scenarios can occur when memory is reallocated among virtual machines between a request for transmission and packet building, when memory is reallocated due to migration of a virtual machine, or when memory is reallocated prior to receipt of a data packet addressed to a virtual memory address that was previously valid.

If the packet builder 142 is unable to determine a valid translated address for the virtual memory address, however, the packet builder 142 can enter an error handling routine. Such an error handling routine is described in further detail below with respect to FIGS. 4 and 5. Once the packet builder 142 has obtained a second virtual memory address for which it can determine a valid translated address, the packet builder 142 can generate a data packet using data from a host device memory location indicated by the translated address. The network interface card 140 can then transmit the data packet.

The network interface card 140 includes the packet forwarder 144. The packet forwarder 144 can receive a data packet over one of the lines 600, translate the destination address, and forward the data packet to a location in the memory 115 allocated to a destination virtual machine 150. An example operation of the packet forwarder 144 is as follows. The packet forwarder 144 receives the data packet addressed to a destination virtual machines 150 executing on the network device 110. The packet forwarder 144 can select a receive queue assigned to the virtual machine 150, and retrieve a buffer descriptor from the selected receive queue. The buffer descriptor includes a virtual memory address associated with the virtual machine. The packet forwarder 144 can attempt to translate the virtual memory address to a physical address in the memory 115. If the packet forwarder 144 is able to determine a valid translated address for the virtual memory address, the packet forwarder 144 can store the data packet in the location in memory 115 specified by the translated address. The packet forwarder 144 can translate virtual memory address in a manner similar to that described for the packet builder 142.

If the packet forwarder 144 is unable to determine a valid translated address for the virtual memory address, however, the packet forwarder 144 can enter an error handling routine. Such an error handling routine is described in further detail below with respect to FIGS. 2 and 3. Once the packet forwarder 144 is able to determine a valid memory region in the network device memory 115 associated with the destination virtual machine 150, the packet forwarder 144 can store contents of the data packet in the memory region.

In some implementations, following, or concurrent with, forwarding of the contents of the data packet to the memory 115 by the packet forwarder 144, the hypervisor 130 can allocate a new page of the memory 115 to the virtual machine 150 that was the intended destination of the data packet. The hypervisor can then update the memory 146 of the network interface card with the memory address of the newly allocated page of memory, and associate the newly allocated page with the virtual machine.

Figure 2:
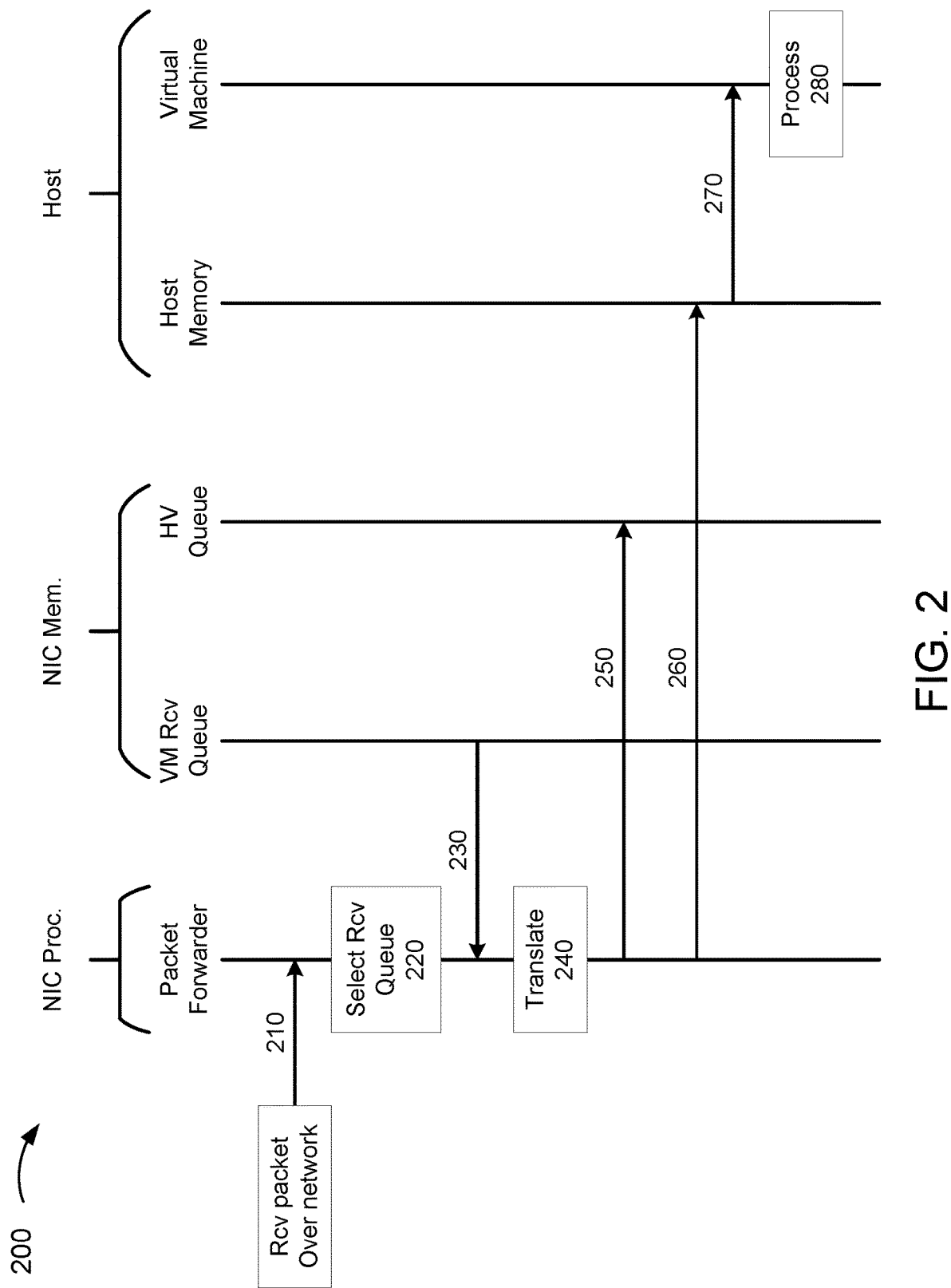
FIG. 2 is a swim lane diagram illustrating operations for handling translation errors when receiving packets for a virtual machine on a host device, according to some implementations.

FIG. 2 is a swim lane diagram 200 illustrating operations for handling translation errors when receiving packets for a virtual machine on a host device, according to some implementations. The swim lane diagram 200 shows the interaction of various components of the system during an example operation of error handling for a received packet.

The packet forwarder of the network interface card receives a data packet (210) over the network. The packet forwarder determines a destination virtual machine for the data packet, and selects (220) a virtual machine receive queue associated with the destination virtual machine. The packet forwarder retrieves (230) a buffer descriptor from a head of the receive queue and extracts a virtual memory address from the buffer descriptor. The packet forwarder attempts to translate (240) the virtual memory address to determine a valid translated address to a host device memory location associated with the destination virtual machine. If the packet forwarder experiences a translation error; for example, because the virtual memory address no longer translates to a physical memory address to a host device memory location that is still assigned to the destination virtual machine, the packet forwarder can fall back to a hypervisor queue. In some implementations, the network interface card will maintain a separate hypervisor queue for each virtual machine receive queue. In some implementations, the network interface card will maintain a separate hypervisor queue for each virtual machine. In some implementations the network interface card may maintain one or more shared hypervisor queues shared for multiple virtual machines. The packet forwarder can retrieve (250) a backup buffer descriptor from the hypervisor queue, and extract a backup memory address from the backup buffer descriptor. The packet forwarder can then store (260) data from the receive data packet at a host device memory location indicated by the backup memory address. The destination virtual machine can then retrieve (270) the data from the host device memory and process it (280).

Figure 3:
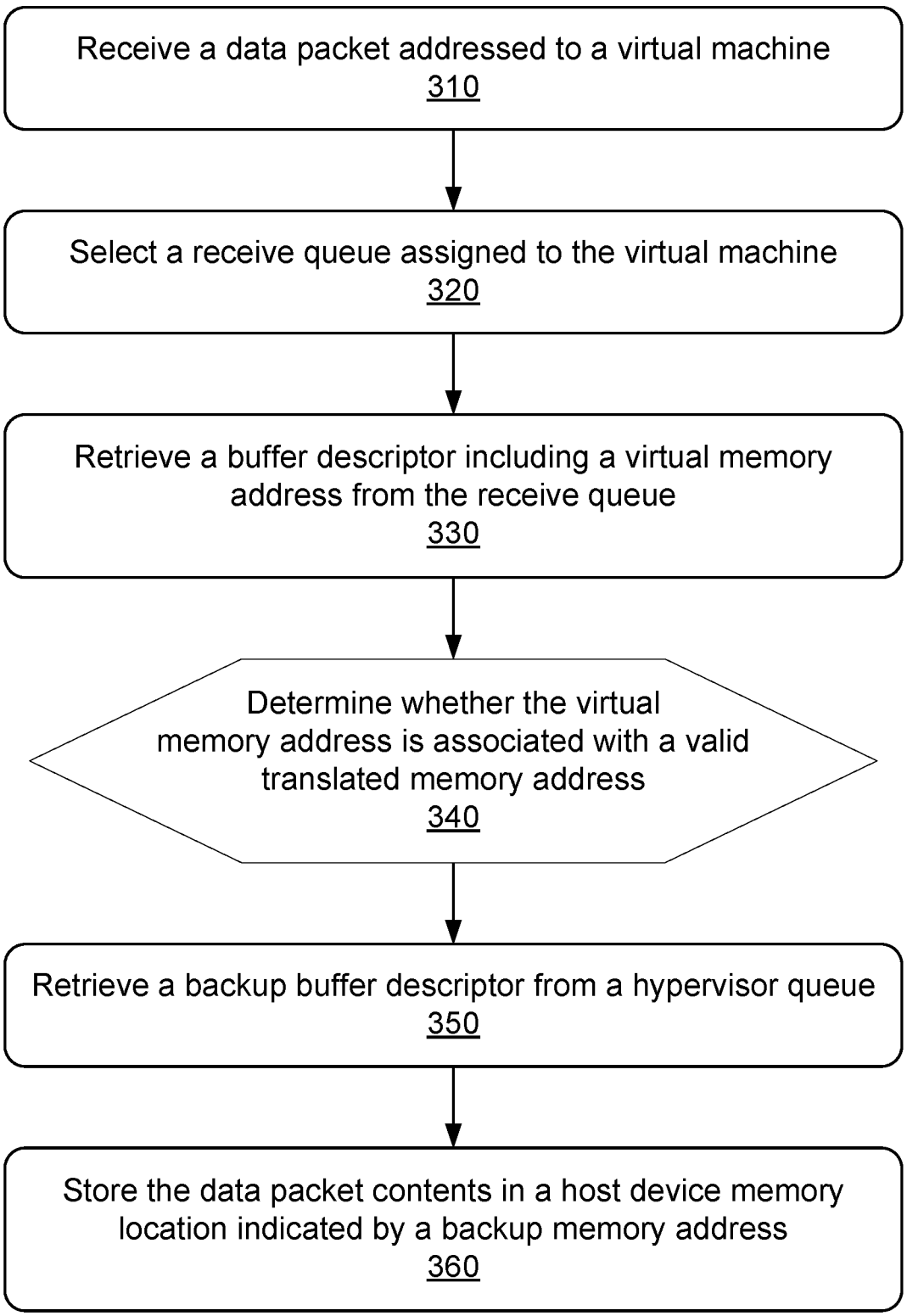
FIG. 3 is a flowchart showing operations of an example method of handling translation errors when receiving packets for a virtual machine on a host device, according to some implementations.

FIG. 3 is a flowchart showing operations of an example method 300 of handling translation errors when receiving packets for a virtual machine on a host device, according to some implementations. The method 300 can be performed by a network interface card, such as the network interface card 140 previously described. The method 300 includes receiving a data packet addressed to a virtual machine (stage 310). The method 300 includes selecting a receive queue assigned to the virtual machine (stage 320). The method 300 includes retrieving a buffer descriptor including a virtual memory address from the receive queue (stage 330). The method 300 includes determining whether the virtual memory address is associated with a valid translated memory address (decision block 340). The method 300 includes retrieving a backup buffer descriptor from a hypervisor queue (stage 350). The method 300 includes storing the data packet in a host device memory location indicated by a backup memory address (stage 360).

The method 300 includes receiving a data packet addressed to a virtual machine (stage 310). The data packet can be received by a packet forwarder of the network interface card, such as the packet forwarder 144 previously described. The data packet can be received over a network connection from a remote client device, peer network device, controller device, or the like.

The method 300 includes selecting a receive queue assigned to the virtual machine (stage 320). The packet forwarder can select a receive queue from the network interface card memory, such as the memory 146 previously described. The receive queue can include one or more buffer descriptors.

The method 300 includes retrieving a buffer descriptor including a virtual memory address from the receive queue (stage 330). The packet forwarder can retrieve the buffer descriptor from the head of the receive queue. The buffer descriptor includes a virtual memory address that indicates a memory location associated with the virtual machine. The virtual memory address is not a physical memory address, and therefore must be translated before the network interface card can access the corresponding memory region.

The method 300 includes determining whether the virtual memory address is associated with a valid translated memory address (decision block 340). If the network interface cannot determine a valid translated address for the virtual address, the method 300 continues with stage 350 as described below. If the network interface can determine a valid translated address, the packet forwarder can store the data packet in a memory location indicated by the translated memory address according to the normal operation.

If the network interface cannot determine a valid translated address for the virtual memory address, the method 300 continues by retrieving a backup buffer descriptor from a hypervisor queue (stage 350). The packet forwarder 144 can retrieve the backup buffer descriptor from the head of the hypervisor queue associated with the destination virtual machine. The backup buffer descriptor can include a backup memory address that indicates a memory location in the memory 115 that can accept the received data packet and store it for processing by the destination virtual machine.

The method 300 includes storing the data packet in a host device memory location indicated by a backup memory address (stage 360). The hypervisor can notify the virtual machine of the location of the data packet so the virtual machine may retrieve and process it.

Figure 4:
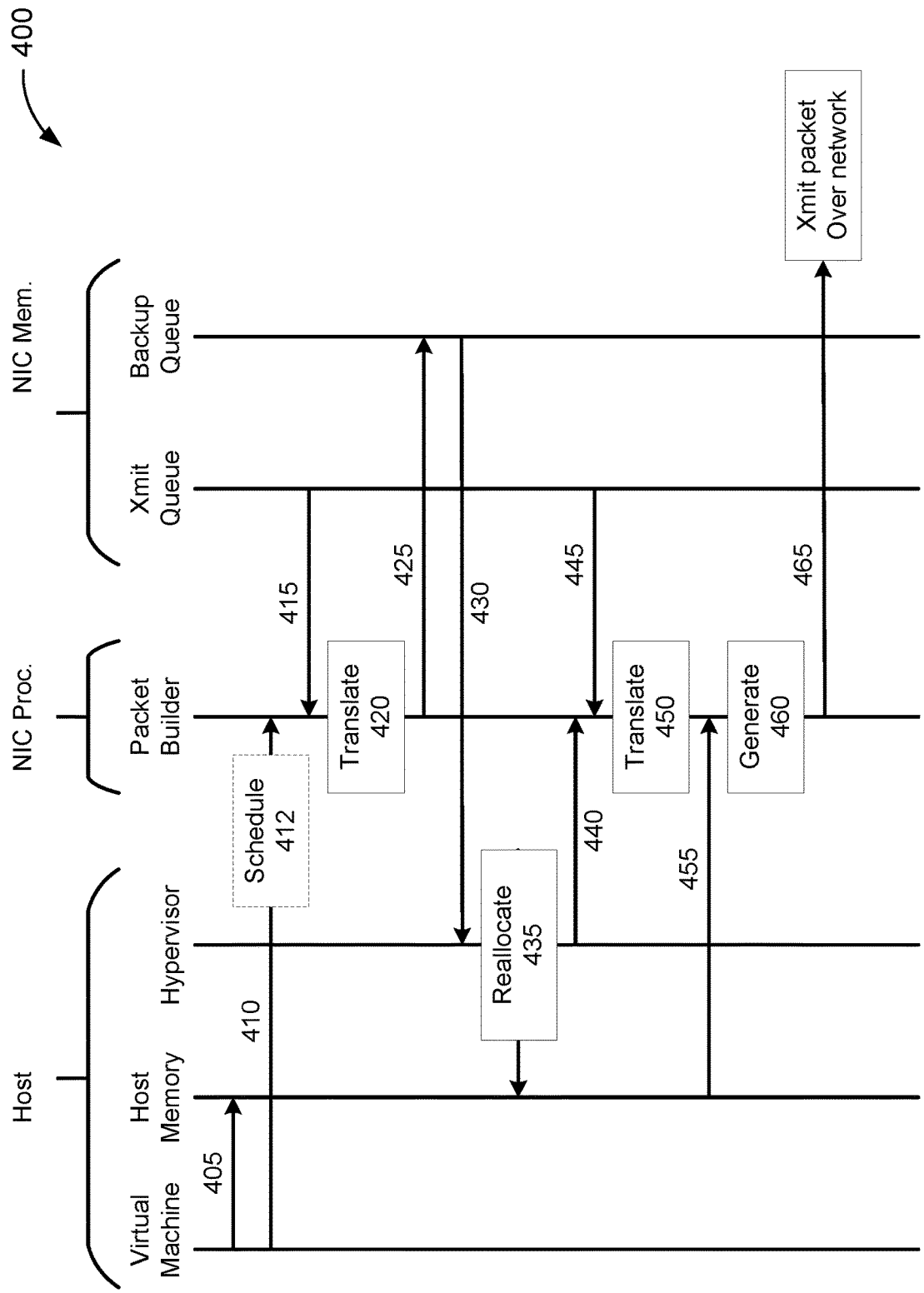
FIG. 4 is a swim lane diagram illustrating operations for handling translation errors when transmitting packets from a virtual machine on a host device, according to some implementations.

FIG. 4 is a swim lane diagram 400 illustrating operations for handling translation errors when transmitting packets from a virtual machine on a host device, according to some implementations. The swim lane diagram 400 shows the interaction of various components of the system during an example operation of error handling for a transmitted packet.

Prior to operation of the translation error handling, a virtual machine executing on a host device will begin the process of transmitting a packet via a network interface card of the host device. The virtual machine will store (405) data for the data packet to be generated in the host device memory. The virtual machine will then send a transmission request (410) to a packet builder of the network interface card.

In some implementations, the transmission request (410) can be delayed, prioritized, or otherwise scheduled awaiting a predetermined or indefinite period of time (412). Such scheduling can be accomplished using, for example, the scheduler 141 and/or the time-indexed data structure previously described. Processing the transmission request for transmission can recommence at a predetermined time, or when all higher priority requests and/or previously transmitted requests have been processed.

The packet builder receives the transmission request (410) from the virtual machine (or, in some implementations, the scheduler 141 or time-indexed data structure). The packet builder retrieves a packet descriptor (415) from a transmit queue corresponding to the virtual machine and residing in the memory of the network interface card, and extracts a virtual memory address from the buffer descriptor. The packet builder will attempt to translate (420) the virtual memory address to determine a valid translated address to a host device memory location associated with the virtual machine that send the transmission request. If the packet builder experiences a translation error; for example, because the virtual memory address no longer translates to a physical memory address to a host device memory location that is still assigned to the virtual machine, the packet builder sends a message (425) to a backup queue in the network interface card memory. The message will include an identifier of the transmit queue and the virtual memory address that could not be translated successfully. The packet builder can disable the transmit queue until the packet builder receives a notification that memory has been reallocated to the transmitting virtual machine.

A hypervisor executing on the host device can retrieve the message (430) from the backup queue. The hypervisor can reallocate (435) a host device memory region to the virtual machine. The hypervisor, which can be configured to back up the contents of an old page of memory allocated to the virtual machine when reallocating the memory to a different virtual machine, can retrieve the backup and store its contents in the new page of memory. The hypervisor can send a notification (440) to the packet builder that the host device memory region has been reallocated, and the transmit queue can be reactivated.

The packet builder can receive the notification (440) from the hypervisor that the hypervisor has reallocated host device memory to the transmitting virtual machine. The packet builder can then retrieve a second packet descriptor (445) from the transmit queue, and extract a second virtual memory address from the second packet descriptor. The packet builder can attempt to translate (450) the second virtual memory address. If the translation is successful, the packet builder can retrieve the data (455) from a location of the host device memory indicated by the translated second virtual memory address. The packet builder can use the retrieved data to generate (455) the data packet. The packet builder can then transmit the generated data packet (460) over a network.

Figure 5:
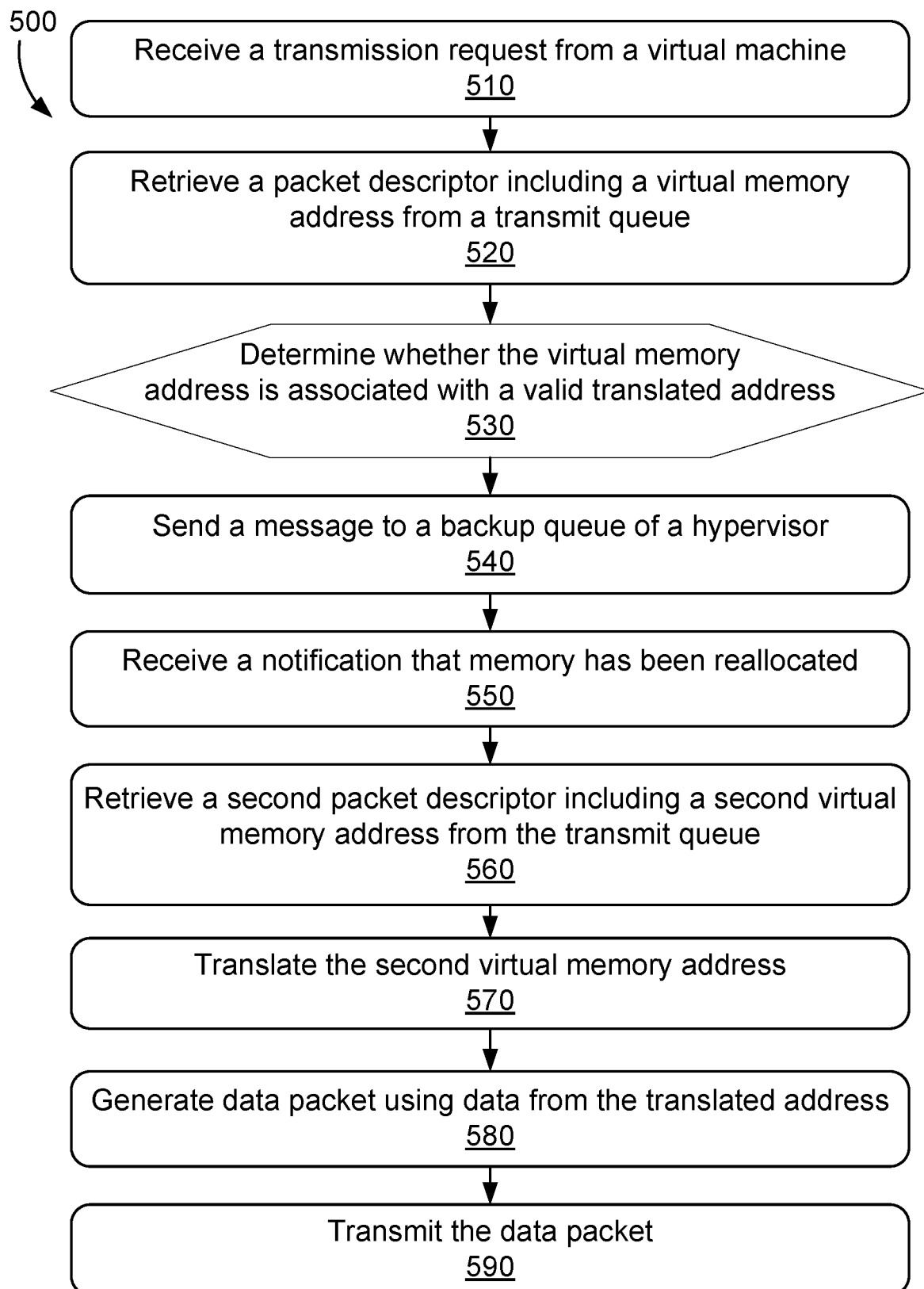
FIG. 5 is a flowchart showing operations of an example method of handling translation errors when transmitting packets from a virtual machine on a host device, according to some implementations.

FIG. 5 is a flowchart showing operations of an example method 500 of handling translation errors when transmitting packets from a virtual machine on a host device, according to some implementations. The method 500 can be performed by a network interface card, such as the network interface card 140 previously described. The method 500 can include receiving a transmission request from a virtual machine (stage 510). The method 500 can include retrieving a packet descriptor including a virtual memory address from a transmit queue (stage 520). The method 500 can include determining whether virtual memory address is associated with a valid translated address (decision block 530). If the network interface card cannot determine a valid translated address for the virtual memory address, the method can continue with stage 540 described below. If the network interface can determine a valid translated address, the network interface card can generate and transmit the data packet normally. The method 500 can include sending a message to a backup queue of a hypervisor (stage 540). The method 500 can include receiving a notification that memory has been reallocated (stage 550). The method 500 can include retrieving a second packet descriptor including a second virtual memory address from the transmit queue (stage 560). The method 500 can include translating the second virtual memory address (stage 570). The method 500 can include generating a data packet using data from the translated address (stage 580). The method 500 can include transmitting the data packet (stage 590).

The method 500 can include receiving a transmission request from a virtual machine (stage 510). The transmission request can be received by a scheduler of the network interface card, such as the scheduler 141 previously described. In some implementations, the scheduler 141 can maintain a time-indexed data structure in a network interface card memory, such as the memory 146 previously described. The scheduler 141 can insert a packet identifier corresponding to the transmission request into the time-indexed data structure. When the scheduled time for data packet transmission arrives, a packet builder, such as the packet builder 142 can retrieve the packet identifier and commence generating a data packet corresponding to the transmission request. In some implementations, the packet builder 142 can receive the transmission request directly from the virtual machine, and proceed with generating the corresponding data packet immediately.

The method 500 can include retrieving a packet descriptor including a virtual memory address from a transmit queue (stage 520). When the scheduled time for transmission of the data packet arrives, the packet builder can use information in the packet identifier and/or the transmission request to retrieve the packet descriptor from the transmit queue associated with the virtual machine that submitted the transmission request. The packet descriptor can include a virtual memory address that indicates a memory location associated with the virtual machine. The virtual memory address is not a physical memory address, and therefore must be translated before the network interface card can access the corresponding memory region.

The method 500 can include determining whether virtual memory address is associated with a valid translated address (decision block 530). If the network interface card cannot determine a valid translated address for the virtual memory address, the method can continue with stage 540 described below. If the network interface can determine a valid translated address, the network interface card can generate the data packet based on data in a memory location indicated by the translated memory address, and transmit the data packet according to the normal operation.

If the network interface card cannot determine a valid translated address for the virtual memory address, the method 500 can include sending a message to a backup queue of a hypervisor (stage 540). The message can include an identifier of the transmit queue and the virtual memory address. Based on this information, the hypervisor can create a new, valid queue, with new packet descriptors with updated virtual memory addresses that will have valid translated addresses. The hypervisor can then notify the packet builder that the new queue has been created. While the network interface card awaits notification of the creation of a new queue from the hypervisor, it can cease using the old transmit queue.

The method 500 can include receiving a notification that host device memory has been reallocated to the transmitting virtual machine (stage 550). The packet builder can receive the notification regarding the memory reallocation from the hypervisor. Upon receiving the notification, the packet builder can reactivate the transmit queue.

The method 500 can include retrieving a second packet descriptor including a second virtual memory address from the transmit queue (stage 560). Once the packet builder has received the notification, the packet builder can reactivate the transmit queue retrieve the second packet descriptor from the head of the transmit queue, and extract the second virtual memory address.

The method 500 can include translating the second virtual memory address (stage 570). The second virtual memory address should in almost every case be valid, having been very recently provided by the hypervisor; that is, without a delay awaiting the scheduled time for transmission.

The method 500 can include generating a data packet using data from the translated address (stage 580). The packet builder can retrieve the data from the memory location indicated by the translated address and use the data to generate the data packet. In some implementations, the translated address can point to a location in memory (either network interface card memory or host device memory) containing a scatter-gather list. The scatter-gather list can include memory pointers to additional memory locations containing data for the packet payload and/or header.

The method 500 can include transmitting the data packet (stage 590). The network interface card can then transmit the data packet through one the links to the network. In some implementations, the network interface card can send a transmission completion message to the virtual machine indicating that the packet has been successfully transmitted.

FIG. 6 is a block diagram illustrating a general architecture for a computer system 1000 that may be employed to implement elements of the systems and methods described and illustrated herein, according to an illustrative implementation.

In broad overview, the computing system 1010 includes at least one processor 1050 for performing actions in accordance with instructions and one or more memory devices 1070 or 1075 for storing instructions and data. The illustrated example computing system 1010 includes one or more processors 1050 in communication, via a bus 1015, with at least one network interface driver controller 1020 with one or more network interface cards 1022 connecting to one or more network devices 1024, memory 1070, and any other devices 1080, e.g., an I/O interface. The network interface card 1022 may have one or more network interface driver ports to communicate with the connected devices or components. Generally, a processor 1050 will execute instructions received from memory. The processor 1050 illustrated incorporates, or is directly connected to, cache memory 1075.

In more detail, the processor 1050 may be any logic circuitry that processes instructions, e.g., instructions fetched from the memory 1070 or cache 1075. In many embodiments, the processor 1050 is a microprocessor unit or special purpose processor. The computing device 1000 may be based on any processor, or set of processors, capable of operating as described herein. The processor 1050 may be a single core or multi-core processor. The processor 1050 may be multiple processors. In some implementations, the processor 1050 can be configured to run multi-threaded operations. In some implementations, the processor 1050 may host one or more virtual machines or containers, along with a hypervisor or container manager for managing the operation of the virtual machines or containers. In such implementations, the methods shown in FIG. 3 and FIG. 5 can be implemented within the network interface card in conjunction with the virtualized or containerized environments provided on the processor 1050.

The memory 1070 may be any device suitable for storing computer readable data. The memory 1070 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 1000 may have any number of memory devices 1070. In some implementations, the memory 1070 supports virtualized or containerized memory accessible by virtual machine or container execution environments provided by the computing system 1010.

The cache memory 1075 is generally a form of computer memory placed in close proximity to the processor 1050 for fast read times. In some implementations, the cache memory 1075 is part of, or on the same chip as, the processor 1050. In some implementations, there are multiple levels of cache 1075, e.g., L2 and L3 cache layers.

The network interface driver controller 1020 manages data exchanges via the network interface driver 1022 (also referred to as network interface driver ports). The network interface driver controller 1020 handles the physical and data link layers of the OSI model for network communication. In some implementations, some of the network interface driver controller's tasks are handled by the processor 1050. In some implementations, the network interface driver controller 1020 is part of the processor 1050. In some implementations, a computing system 1010 has multiple network interface driver controllers 1020. The network interface driver ports configured in the network interface card 1022 are connection points for physical network links. In some implementations, the network interface controller 1020 supports wireless network connections and an interface port associated with the network interface card 1022 is a wireless receiver/transmitter. Generally, a computing device 1010 exchanges data with other network devices 1024 via physical or wireless links that interface with network interface driver ports configured in the network interface card 1022. In some implementations, the network interface controller 1020 implements a network protocol such as Ethernet.

The other network devices 1024 are connected to the computing device 1010 via a network interface driver port included in the network interface card 1022. The other network devices 1024 may be peer computing devices, network devices, or any other computing device with network functionality. For example, a first network device 1024 may be a network device such as a hub, a bridge, a switch, or a router, connecting the computing device 1010 to a data network such as the Internet.

The other devices 1080 may include an I/O interface, external serial device ports, and any additional co-processors. For example, a computing system 1010 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1000 includes an additional device 1080 such as a coprocessor, e.g., a math co-processor can assist the processor 1050 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of error handling in a network interface card of a host device, the method comprising:
    receiving, at a processor of the network interface card, a data packet addressed to a virtual machine executing on the host device;
    selecting, by the processor, a receive queue corresponding to the virtual machine and residing in a memory of the network interface card;
    retrieving, by the processor, a buffer descriptor from the receive queue, wherein the buffer descriptor includes a virtual memory address; and
    in response to determining that the virtual memory address is not associated with a valid translated memory address associated with the virtual machine:
        retrieving, by the processor, a backup buffer descriptor from a hypervisor queue residing in the network interface card memory and corresponding to a hypervisor executing on the host device; and
        storing, by the processor, contents of the data packet in a host device memory location indicated by a backup memory address in the backup buffer descriptor.

2. The method of claim 1, comprising:
    receiving, at the processor, a second data packet addressed to the virtual machine;
    selecting, by the processor, a second receive queue assigned to the virtual machine and residing in a memory of the network interface card;
    retrieving, by the processor, a second buffer descriptor from the second receive queue, wherein the second buffer descriptor includes a second virtual address;
    in response to determining that the second virtual address is associated with a valid second translated address associated with the virtual machine, storing, by the processor, the second data packet in a second host device memory location indicated by the second translated address.

3. The method of claim 1, comprising:
    allocating, by the hypervisor in response to receiving a notification from the network interface card that the address in the buffer descriptor is not associated with a valid translated address, a new page of host device memory to the virtual machine, wherein the host device memory location is in the new page.

4. The method of claim 1, wherein the hypervisor has allocated unpinned host device memory to virtual machines.

5. The method of claim 4, wherein the hypervisor has allocated host device memory to virtual machines that in aggregate exceeds a total host device memory available to the virtual machines.

6. The method of claim 1, comprising:
migrating, by the hypervisor, the virtual machine to a second host device, wherein the processor receives the data packet during the migration after memory previously allocated to the virtual machine has been reallocated to a second virtual machine;
maintaining, by the processor, a list of memory locations associated with the virtual machine that change during the migration; and
transferring, by the processor, data from the memory locations maintained in the list to a second memory associated with the migrated virtual machine on the second host device.

7. A system comprising a host device executing one or more virtual machines and a hypervisor, a host device memory, and a network interface card configured to:
receive a data packet addressed to a virtual machine executing on the host device;
select a receive queue corresponding to the virtual machine and residing in a memory of the network interface card;
retrieve a buffer descriptor from the receive queue, wherein the buffer descriptor includes a virtual memory address; and
in response to determining that the virtual memory address is not associated with a valid translated memory address associated with the virtual machine:
retrieve a backup buffer descriptor from a hypervisor queue residing in the network interface card memory and corresponding to a hypervisor executing on the host device; and
store contents of the data packet in a host device memory location indicated by a backup memory address in the backup buffer descriptor.

8. The system of claim 7, the network interface card configured to:
receive a second data packet addressed to the virtual machine;
select a second receive queue assigned to the virtual machine and residing in a memory of the network interface card;
retrieve a second buffer descriptor from the second receive queue, wherein the second buffer descriptor includes a second virtual address;
in response to determining that the second virtual address is associated with a valid second translated address associated with the virtual machine, store the second data packet in a second host device memory location indicated by the second translated address.

9. The system of claim 7, wherein the hypervisor is configured to allocate, in response to receiving a notification from the network interface card that the address in the buffer descriptor is not associated with a valid translated address, a new page of host device memory to the virtual machine, wherein the host device memory location is in the new page.

10. The system of claim 9, wherein the hypervisor has allocated unpinned host device memory to the virtual machines.

11. The system of claim 7, wherein the hypervisor has allocated host device memory to the virtual machines that in aggregate exceeds a total host device memory available to the virtual machines.

12. The system of claim 7, wherein:
the hypervisor is configured to migrate the virtual machine to a second host device, wherein the network interface card receives the data packet during the migration after memory previously allocated to the virtual machine has been reallocated to a second virtual machine; and
the network interface card is configured to:
maintain a list of memory locations associated with the virtual machine that change during the migration; and
transfer data from the memory locations maintained in the list to a second memory associated with the migrated virtual machine on the second host device.

13. A method of error handling in a network interface card of a host device, the method comprising:
receiving, at a processor of the network interface card, a transmission request from a virtual machine executing on the host device;
retrieving, by the processor, a packet descriptor from a transmit queue corresponding to the virtual machine and residing in a memory of the network interface card, wherein the packet descriptor includes a virtual memory address; and
in response to determining that the virtual memory address is not associated with a valid translation memory address associated with the virtual machine:
sending, by the processor, a message to a backup queue residing in the network interface card memory and corresponding to a hypervisor executing on the host device, the message including an identifier of the transmit queue and the virtual memory address;
receiving, by the processor, a notification from the hypervisor that a host device memory region has been reallocated to the virtual machine;
retrieving, by the processor from the transmit queue, a second packet descriptor including a second virtual memory address;
translating, by the processor, the second virtual memory address;
generating, by the processor, a data packet using data from a host device memory location indicated by the translated second virtual memory address; and
transmitting, by the processor, the data packet.

14. The method of claim 13, comprising:
receiving, by the processor, a second transmission request from the virtual machine;
retrieving, by the processor, a third packet descriptor from a second transmit queue corresponding to the virtual machine, wherein the third packet descriptor includes a third virtual memory address;
translating, by the processor, the third virtual memory address;
in response to determining that the third virtual memory address is associated with a valid translation memory address associated with the virtual machine:
generating, by the processor, a second data packet using data from a second host device memory location indicated by the translated third virtual memory address; and
transmitting, by the processor, the second data packet.

15. The method of claim 13, comprising:

allocating, by the hypervisor in response to determining that the virtual memory address is not associated with a valid translation memory address associated with the virtual machine, a new page of host device memory to the virtual machine;

retrieving, by the hypervisor from the host device memory, backup data of a host device memory location previously associated with the virtual machine; and storing, by the processor, the backup data in the new page.

16. The method of claim 13, wherein the hypervisor has allocated unpinned host device memory to virtual machines.

17. The method of claim 16, wherein the hypervisor has allocated host device memory to virtual machines that in aggregate exceeds a total host device memory available to the virtual machines.

18. The method of claim 13, comprising:

migrating, by the hypervisor, the virtual machine to a second host device, wherein the processor receives the data packet during the migration after memory previously allocated to the virtual machine has been reallocated to a second virtual machine;

maintaining, by the processor, a list of memory locations associated with the virtual machine that change during the migration; and transferring, by the processor, data from the memory locations maintained in the list to a second memory associated with the migrated virtual machine on the second host device.

19. A system comprising a host device executing one or more virtual machines and a hypervisor, a host device memory, and a network interface card configured to:

receive a transmission request from a virtual machine executing on the host device;

retrieving, by the processor, a packet descriptor from a transmit queue corresponding to the virtual machine and residing in a memory of the network interface card, wherein the packet descriptor includes a virtual memory address; and in response to determining that the virtual memory address is not associated with a valid translation memory address associated with the virtual machine:

send a message to a backup queue residing in the network interface card memory and corresponding to a hypervisor executing on the host device, the message including an identifier of the transmit queue and the virtual memory address;

receive a notification from the hypervisor that a host device memory region has been reallocated to the virtual machine;

retrieve, from the transmit queue, a second packet descriptor including a second virtual memory address;

translate the second virtual memory address;

generate a data packet using data from a host device memory location indicated by the translated second virtual memory address; and transmit the data packet.

20. The system of claim 19, the network interface card configured to:

receive a second transmission request from the virtual machine;

retrieve a third packet descriptor from a second transmit queue corresponding to the virtual machine, wherein the third packet descriptor includes a third virtual memory address;

translate the third virtual memory address;

in response to determining that the third virtual memory address is associated with a valid translation memory address associated with the virtual machine:

generate a second data packet using data from a second host device memory location indicated by the translated third virtual memory address; and transmit the second data packet.

21. The system of claim 19, wherein:

the hypervisor is configured to:

allocate, in response to determining that the virtual memory address is not associated with a valid translation memory address associated with the virtual machine, a new page of host device memory to the virtual machine; and retrieve, from the host device memory, backup data of a host device memory location previously associated with the virtual machine; and the network interface card is configured to store the backup data in the new page.

22. The system of claim 19, wherein the hypervisor has allocated unpinned host device memory to the virtual machines.

23. The system of claim 22, wherein the hypervisor has allocated host device memory to the virtual machines that in aggregate exceeds a total host device memory available to the virtual machines.

24. The system of claim 19, wherein:

the hypervisor is configured to migrate the virtual machine to a second host device, wherein the network interface card receives the data packet during the migration after memory previously allocated to the virtual machine has been reallocated to a second virtual machine; and the network interface card is configured to:

maintain a list of memory locations associated with the virtual machine that change during the migration; and transfer data from the memory locations maintained in the list to a second memory associated with the migrated virtual machine on the second host device.

* * * * *